United States Patent Office 3,499,322
Patented Mar. 10, 1970

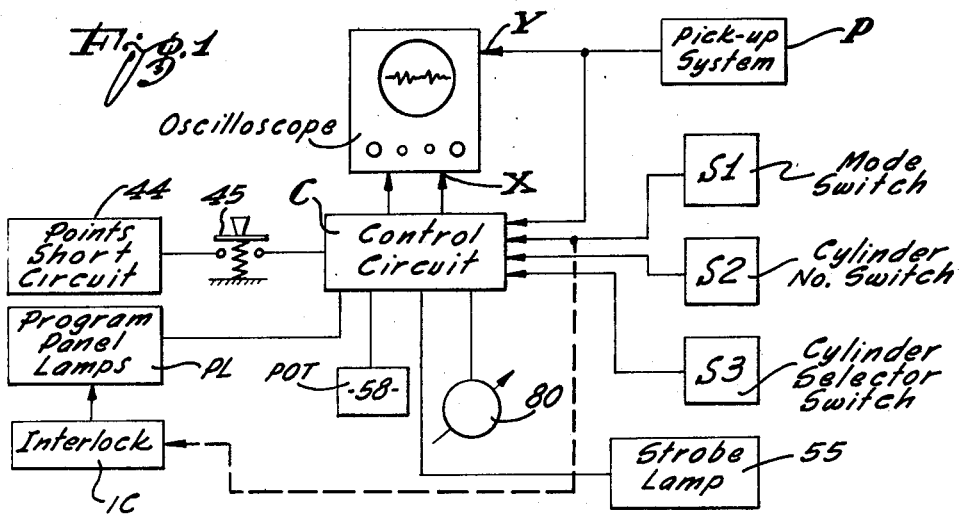
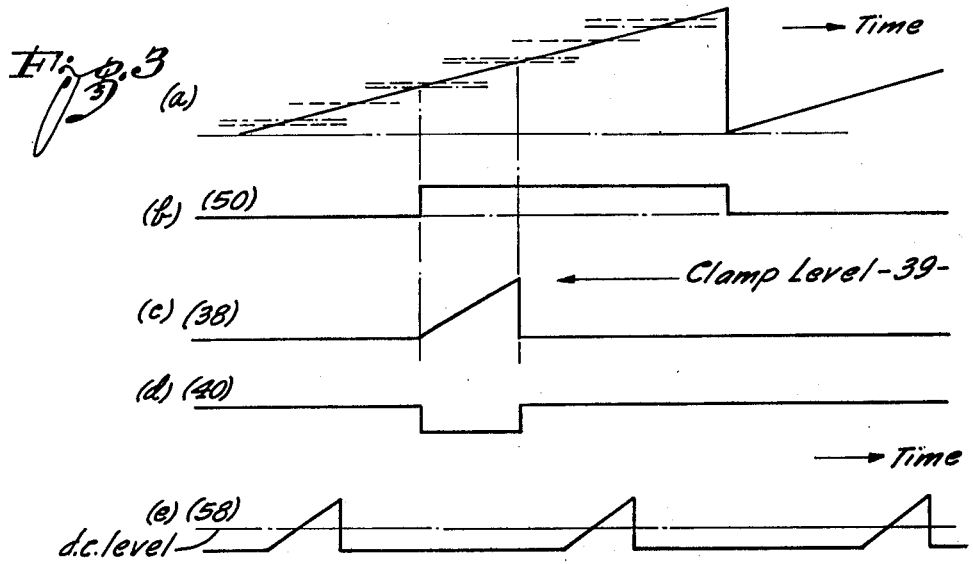

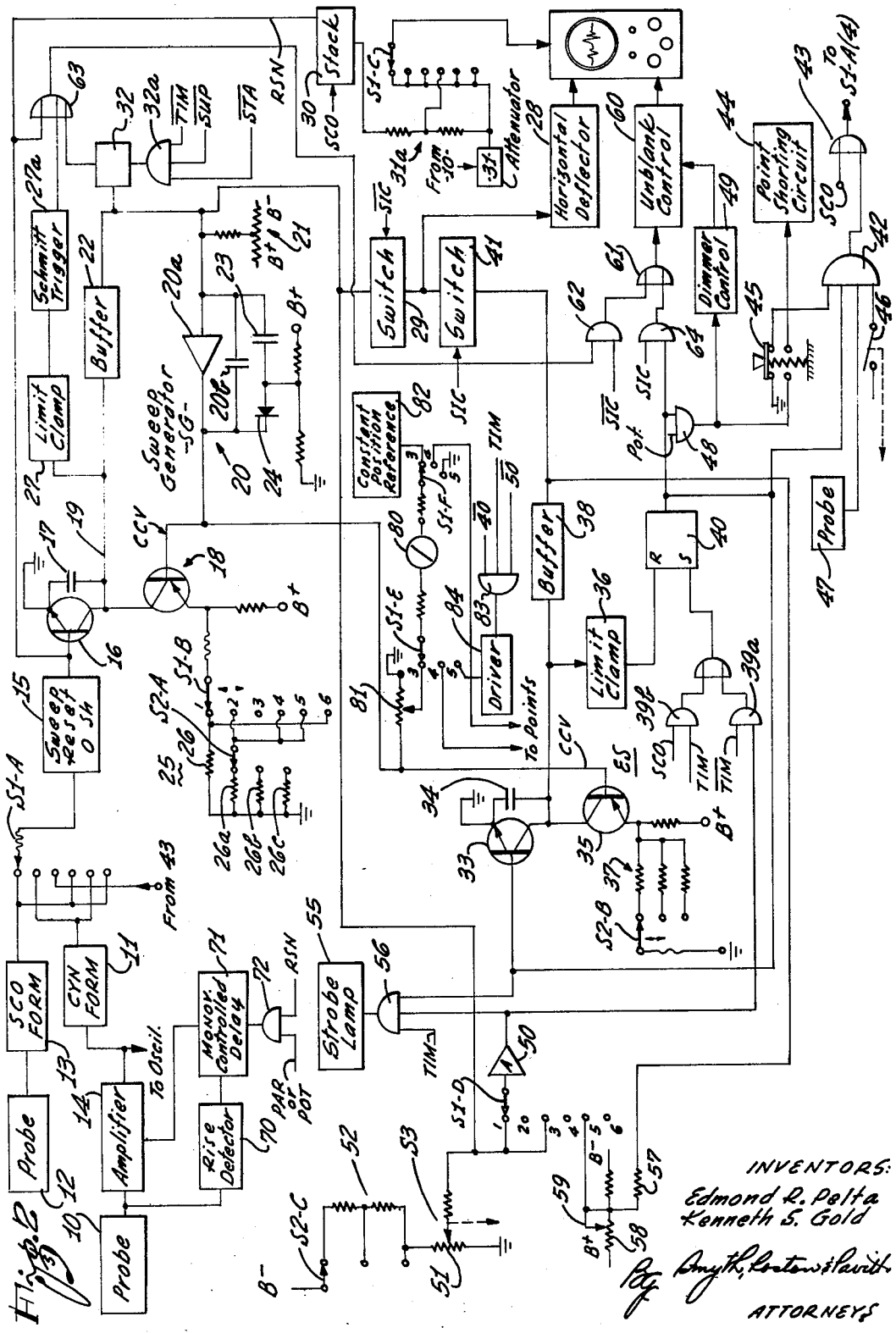

3,499,322
ANALYZING DEVICE FOR AUTOMOTIVE ENGINE
Edmond R. Pelta, Pacific Palisades, and Kenneth S. Gold, Canoga Park, Calif., assignors to Autoscan, Inc., Los Angeles, Calif., a corporation of California
Filed Apr. 29, 1968, Ser. No. 724,758
Int. Cl. G01r 29/02
U.S. Cl. 73—116                 29 Claims

ABSTRACT OF THE DISCLOSURE

A system for controlling the display of ignition signals of automotive engines in an oscilloscope in various configurations and independent from engine speed. A slope controlled time base, sweep signal generator is used to control some of the displays but serves also as variable speed, phase metering device controlling a second sweep generator for providing a likewise speed-dependent slope and adjustable, speed-independent phase as to sweep begin within each engine cycle. The second generator controls also selective cylinder short-circuiting and stroboscopic illumination for observation of ignition advance.

---

The present invention relates to a system for controlling the conduction and performance of tests on an internal combustion engine, such as an automotive engine, or the like. In particular, the invention relates to a system for connection to the ignition circuit of such an engine for the conduction and control of tests thereon. The system, in accordance with the present invention, is constructed to be operated in one of the following six modes.

The first mode is the so-called "single cylinder" mode, and the particular test conducted here requires the visible display of the waveform of the ignition signals for one cylinder, for example, on the display screen of an oscilloscope. The system includes a principal sweep or time base generator controlled in response to the ignition pulses derived from the ignition circuit of one particular cylinder. The sweep generator provides a sawtooth wave-type ramp or sweep signal which is respectively reset and restarted in response to these particular ignition pulses. A feedback control for the sweep generator responds to the sweep signal averages the same and references it to a reference signal. The resulting error signal is used for adjusting the slope of the sweep so that the slope of the ramp defining the sweep is always proportionate to the engine speed.

The sweep generator is thus synchronized to the ignition pulses for one particular cylinder. The sweep signal represents a time base of progressively variable amplitude beginning at a particular phase during each engine cycle and linearly varying from one time of resetting up to the next one. The sweep signal, therefore, meters progressively the different phases for each revolution and on a repetitive basis, whereby in particular, the above-mentioned feedback loop adapts this time base generator to variable speed conditions as they may occur or intentionally be induced. This time base signal is now referenced against an adjustable but fixed signal. When the time base signal has reached the adjusted value of the reference signal, a particular control signal is produced. The occurrence of such a control signal determines a particular phase within once per engine cycle. The control signal is repeatedly produced, preferably once per engine cycle. The phase of the resulting train of control signal, relative to the sweep-type signal and taken in relation to the progressive engine positions during a revolution remains constant even if the speed of the engine varies.

The control signal developed as described is used for controlling the starting of a second, auxiliary sweep generator. The slope of the corresponding second sweep or ramp signal is controlled by the above-mentioned speed proportionate signal of the first sweep generator. This second sweep signal, therefore, is produced at an adjustable phase within an engine cycle. The slope of this second sweep is steeper to govern, under the existing speed conditions, the period of time for one of the ignition signals within the ignition cycle. The particular one is selected by adjusting the reference signal for this mode. The second sweep or ramp signal is now used during mode #1 for controlling the horizontal deflection or time base of the oscilloscope. In addition, the period of time between beginning of the second sweep and the time when the second sweep signal reaches a particular level, and which period is proportionate to engine speed, is ascertained for the formation of a control signal for unblanking the oscilloscope during that particular period.

The second mode is called the "superimposed" mode. The principle sweep generator is also used here to control the horizontal sweep of the oscilloscope. Furthermore, this first, principle sweep generator is triggered and reset in synchronism with each ignition signal, so that all ignition signals appear superimposed upon the display screen of the oscilloscope.

A more detailed study of all ignition pulses separated by cylinder number is possible in the stack mode, mode #4. Here the cylinder signals for the different cylinders appear vertically stacked. Hence, the oscilloscope is basically controlled as in the superimposed mode, except that from cylinder to cylinder a different, vertically displaced horizontal base line is established, but the same base line is used for each cylinder within sequential cylinder cycles.

A somewhat different comparison of the several ignition pulses can be made in the so-called "parade" mode, mode #6. In this mode, the horizontal sweep is still controlled from the principal sweep generator, but that generator is only reset once per engine cycle. Sequential ignition signals for one particular cylinder are displayed thereon superimposed, and the ignition signals for different cylinders appear in side by side relationship. Each horizontal sweep causes display of all ignition signals for one engine cycle in the parade mode. For example, for a four cylinder engine, the display screen will show four different ignition signals in a side by side relationship over a time base which is exactly equal to the period of time required for one engine revolution. The oscilloscope is connected to receive the ignition signals for control of the vertical deflection of the beam in the tube of the oscilloscope.

The feedback loop operates as described whereby, however, as a particular feature a changeover from mode 6 to modes 2 or 4 involves a particular change of the slope control. The feedback signal which controls the slope in response to the difference between average sweep signal and a reference signal remains the same, if the engine speed does not change, regardless of whether the system operates in mode 6 or in modes 2 or 4. On the other hand, different times bases, i.e., sweep slopes are needed for the two modes.

In order to adjust the slope in accordance with the different requirements of mode 6 and modes 2 and 4, the impedance in the slope control circuit, normally under control of the feedback signal, is changed by the mode change. The average sweep signal remains the same due to a concurrent change in the rate of the reset trigger signals, and in the sweep slope by operation of the mode change. This way the feedback loop is not required to restabilize after the mode change while, on the other hand, the sweep slope control signal permits derivation of a speed proportional signal, which is mode independent. Representatively this signal is a voltage which can be measured and indicated directly by a volt meter calibrated as r.p.m. meter.

Mode 3 is also called "power test" mode or "test" mode for short. In this mode the so-called power test is performed. The oscilloscope is operated as in the parade mode #6 and the second sweep generator including the blanking signal generator thereof is used to selectively inhibit the production of the ignition pulses for a particular cylinder. The points are short circuited in response to the control signal which, in single cylinder mode #1 serves as unblanking signal for the oscilloscope. The performance of this test is in addition dependent upon operation of a manual switch. In a manner analogous to mode #1 operation, a particular cylinder is selected in accordance with the input adjustment for the second or auxiliary ramp generator, and by operation of the manual switch the ignition for the thus selected cylinder can be short circuited or not. Appropriate indications are provided for the r.p.m. loss of the engine, should such loss occur. The control signal is also used for providing contrast enhancement of the ignition signal of the selected cylinder, "parading" on the screen together with the ignition signals for the other cylinder. The latter signals are to appear less pronounced, i.e., dimmer, to emphasize the signal of the cylinder selected before conducting the actual test.

Mode 5 is the so-called "timing" mode. In this mode, a stroboscopic lamp is used, for example, to observe reference marks in the engine for checking on the so-called ignition advance. A preadjustable, constant phase trigger signal for the use of the stroboscope is derived from the above-mentioned second ramp or sweep generator. The sweep slope of this generator is controlled by the first sweep generator. They both start at the same time bearing a fixed relationship to the engine cycle regardless of speed. An additional, adjustable reference value will be provided and referenced against the sweep of the second ramp generator to provide an initially adjustable control signal, the phase of which is constant in relation to the revolution of the engine, even if the engine speed varies. This way a particular phase adjustable signal is used for triggering the stroboscopic lamp to observe the so-called ignition advance when the engine speed is varied. The oscilloscope is operated in mode #5 as in the parade mode #6.

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawing in which:

FIGURE 1 illustrates schematically the layout of an automotive engine testing system in accordance with the present invention;

FIGURE 2 illustrates partially as a circuit diagram, partially as a block diagram, the preferred embodiment in accordance with the invention and is a more detailed illustration of the system as shown in FIGURE 1; and FIGURE 3 includes several curves representing signals plotted against time, and being developed by several of the elements shown in FIGURE 2.

Proceeding now to a detailed description of the drawings: In FIGURE 1 there is illustrated a preferred analyzing system in accordance with the present invention. The system includes esentially the following components. A pickup system P is provided for coupling to the ignition circuit of an automotive engine to receive therefrom all signals flowing in the ignition circuit and before, so to speak, distribution to the several spark plugs in the several cylinders. This signal serves as input signal for an oscilloscope particularly for vertical deflection of the electron beam therein. Thus, the output of pickup system P feeds the so-called Y driver of the oscilloscope.

The pickup system P includes additional means for picking up the ignition pulses for one particular cylinder thus selected to be the "first" one within a cylinder operating cycle. All signals from pickup system P are fed to a control circuit C which includes a sweep signal generator (actually several thereof) for providing the horizontal deflection $x$ of the oscilloscope and thus establishing the time base for the display of the ignition signals. The control circuit controls additionally several instruments, among them a relative speed indicator 80. Control circuit C controls also a stroboscopic lamp 55 to illuminate the rotating engine system, to test, for example, the so-called ignition advance. However, lamp 55 can be used to illuminate any rotating part of an engine. The phase angle of the stroboscopic illumination can be adjusted by means of the adjustable element of a potentiometer 58, being part of the control circuit C. The control circuit C controls means 44 for overbridging the points in the ignition system of the engine to be tested, in synchronism with the engine speed, but for periods arbitrarily determinable by a manually operable test switch 45.

The control circuit is itself under control of a mode switch S1 to establish the several operating modes under which the control circuit can operate. Mode switch S1 causes, among other features, appropriate mode signals to be developed for providing enabling and switching operations in the control circuit. In "single cylinder" mode #1 the enabling signal is called SIC; in "superimpose" mode #2, SUP; in "power test" mode #3, POT; in "timing" mode #5, TIM'; and in "parade" mode #6, PAR. The development of such signals and, where necessary, of the respective complementary signals is conventional, this involves merely the development of particular potentials in suitable signal lines under control of switch S1 and does not require detailed consideration.

A cylinder adjustment switch S2 serves for adaptation of control circuit C to the number of cylinders to be tested. Conveniently, it may distinguish among 4, 6 and 8 cylinder engines, but the system is expandable to any number of cylinders. The control circuit is under control of a cylinder selector switch S3, having for each type of engine as many positions as the number of cylinders of the type. The system may include additional adjusting elements serving as trimmers and fine adjustments, as will be developed more fully below.

In order to provide an aid for the efficient performance of an engine test, a particular test sequence is recommended. Hence, the front panel of the unit (which includes the oscilloscope), may be provided with labeling, recommending a particular sequence of mode switch settings. If the user places the system into the operating modes in the recommended sequences, a particular panel portion becomes illuminated for each setting by means of a set of lamps PL. The panel portion thus illuminated describes briefly the tests to be performed. The panel illumination is interlocked by means of an interlock control IC actuated concurrently with the mode switch setting of switch S1. Any lamp of section PL associated with a particular mode lights up only, if the recommended sequence of mode settings is followed. This way, the best type of oscilloscope display is assured to be used for each test.

In FIGURE 2 the control circuit, mode and adjusting switches and pickup system is shown in some greater detail. The pickup system includes a first probe 10 provided for example, for capacitive or inductive coupling to the distributor in the ignition circuit for an automotive engine. The probe produces an output signal for the "undistributed" voltage in the ignition circuit. The output signal of the probe includes excursions as illustrated in FIGURE 1a, representing the ignition pulse for one cylinder. The signal train provided by the probe is thus a sequence of these types of signals with ignition spikes following at a rate which is determined by r.p.m. of the engine times the number of cylinders thereof.

The output signal of probe 10 is fed through an amplifier 14 to a pulse formation circuit unit 11. The peaks or spikes of the signal train from probe 10 are converted into a more or less rectangular pulse of a sufficient duration and at a voltage and impedance level sufficient for further processing. Conveniently, circuit 11 is a monovibrator, having an input trigger level below the expected peak value of each ignition spike, but above other signal excursions provided by the probe not representing ignition spikes. The output pulses of the circuit unit 11 will, in the following, be called CYN for short. The frequency of pulses CYN again is equal to the produce of r.p.m. and number of cylinders, i.e., it is proportional to the engine speed with the number of cylinders being the proportionality factor.

The output of the circuit 11 is connected to the second, fourth and fifth terminals of a mode switch S1-A. The mode switch S1-A has altogether six switching positions and pertains to the mode switch S1 having a plurality of decks of which S1-A is one. Input contacts 1 and 6 of mode switch S1-A are connected directly to the output of a pulse forming circuit such as a monovibrator 13, which is triggered by the ouput signal derived from a second probe 12. The third input contact of switch S1-A connects to SCO formation circuit 13 through an OR gate 43. The alternative input of OR gate 43 serves to synthesize a pulse SCO in a special situation, to be described below. Probe 12 is connected to the ignition circuit of one particular cylinder. The selection of that cylinder is basically arbitrary, and its ignition serves as a reference in time from which to count subsequent ignitions and also to define complete engine cycles. However, when operating the timing light, the selection of the "zero" cylinder must be such, that the light stroke occurs when the object to be stroboscopically illuminated has a phase to permit such illumination. The output pulses of monovibrator 13 are called SCO and their frequency is directly equivalent to the number of cycles per second of the engine and independent from the number of cylinders of the engine.

Switch S1-A is the principal link between the pickup system P which includes the elements 10 to 13, and the control circuit C to be described next. The output of switch S1-A is either an SCO pulse or a CYN pulse and is used to trigger a single shot or monovibrator 15 producing pulses RSN operating as sweep reset control for a sweep generator SG. The single shot 15 has an astable period of 100 microseconds which is the duration of a pulse RSN to cover the period of retrace. This single shot 15 renders a transistor 16 conductive to discharge the sweep rate capacitor 17. When transistor 16 is nonconductive, a capacitor 17 charges through the transistor pertaining to a current generator 18. The case of the transistor of current generator 18 is controlled by a voltage in the following called CCV.

The collector voltage of transistor 16, i.e., the potential of the particular electrode of capacitor 17, which is not connected to ground is a sawtooth wave which rises linearly from a first level (ground) until a sudden drop due to discharge of capacitor 17 and constituting the retrace. After the voltage in line 19 has dropped back to the first level it begins to rise again as soon as and as long as transistor 16 is cut off, etc.

The voltage across capacitor 17 as effective in line 19 is monitored by a limit clamp device 27 which is a threshold device and prevents the voltage in line 19 from rising beyond a particular level regarded as excessive. When the voltage has reached that particular threshold level, the clamping device 27 clamps the voltage in line 19 to that level and prevents further rise. The output voltage of line 19 is amplified by a buffer 22, the output of which is used to control the horizontal deflection of the electron beam in the oscilloscope in some of the modes. The clamping prevents overdriving the deflection system of the oscilloscope. The spot where the beam intercepts the display screen of the oscilloscope is arrested to a particular point in the right hand side of the screen.

The output voltage of buffer 22 is passed to an integrator 20 as one input thereof. The integrator includes an inverting amplifier 20a and, normally, a feedback capacitor 20b. A voltage as adjusted by means of a resistor network 21 is subtracted from the input of the integrator 20 as derived from the buffer 22. The network 21 is adjusted so that for a regular sweep at stabilized conditions the input of the integrator 20, in terms of a voltage-time integral, has alternatingly equal positive and negative values. The adjustment of network 21 establishes a particular voltage at a fixed level as reference and the input from buffer 22 is an essentially linear voltage for each period of the sawtooth wave train it provides. Thus, the output of integrator 20 will remain essentially constant if retrace of the sawtooth sweep occurs at a time when the output peak of buffer 22 has risen to about twice the adjusted reference value of network 21. This peak value is, of course, well below the level at which the limit clamp 27 responds.

The output of the integrator 20 is the above-mentioned voltage CCV, which stays essentially constant if the alternating or time-voltage integrals of the integrator input are oppositely equal. This establishes a particular state of conduction in the transistor of current source 18 which in turn provides a particular charge rate for capacitor 17. The charge rate of capacitor 17 is the slope of the sawtooth wave at input or output of sweep generator SG as drawn from line 19.

Should any of the retrace control pulses which are the output pulses RSN of a single shot 15, occur, for example, somewhat too late (or too early) then the input for amplifier 20 will be somewhat more or longer positive (negative) during a sweep period than negative (positive) because the output of the buffer 22 will rise to a higher (lower) value before retrace. This disturbs the balance and provides a total nonzero input for the integrator 20; the voltage CCV will be reduced (increased) to increase (reduce) the impedance of the transistor of current source 18, which in turn slows (increases) the charge rate for the capacitor 17, and the slope of the sweeps in the sawtooth wave will become flatter (steeper).

It will be appreciated that the input of integrator 20 is provided by a sequence of pulses the frequency of which goes up with the rate of pulses CYN, which in turn reflects an increase in engine rpm. As a consequence, the voltage CCV will have more ripple at lower than at higher engine speeds. By operation of a biased diode 24 an additional capacitance 23 can be connected to the capacitor 20b in parallel for decreasing engine speeds (decreasing voltage CCV) to increase the time constant of the integrator so that the ripple remains constant over the desired r.p.m. (i.e., CCV) range.

The feedback loop for the entire sweep generator SG, therefore, operates in such a manner as to always stabilize at a sweep rate so that the retrace occurs at a time the inverter output reaches a level having twice the reference voltage as adjusted by impedance network 21. With regard to the control of the oscilloscope it is thus apparent that the difference between minimum and peak values of the sweep signal determines the length of the horizontal sweep. Thus, network 21 adjusts in effect the width of the oscilloscope picture. Furthermore, the circuit as described establishes a sweep signal having a rate of which by feedback control follows changes in the repetition rate of the pulses controlling the retrace, which are either the pulses SCO or the pulses CYN.

These general considerations are made, however, without regard to the resistor 25 connectible through the second deck, S1-B of mode switch S1 to the current source of generator 18, and more particularly to the emitter circuit of the transistor thereof. For a fixed emitter resistance of current generator or source 18 the voltage CCV would be proportional to the pulse rate as passing through mode switch S1-A regardless of the source of the pulses. It is, however, desirable to use the voltage CCV also as engine speed indicator which could be used without further measures if, for example, only the pulses CYN or only the pulses SCO would be used for driving the time base generator SG.

For a given engine speed the pulses CYN have a frequency which is the N fold of the frequency of the pulses SCO, with N being the particular number of cylinders of the engine. Therefore, for a given engine speed, and without further measures, the voltage CCV would be one value if the pulses SCO are used for triggering the retrace of the sweep generator SG, and the voltage CCV would have the N fold value thereof if, without changing the engine speed, the pulses CYN are being used, because in this case the sweep rate would be established by the feedback loop to the N fold of the previous value.

The resistor network 25 is provided for appropriately changing the operating conditions of the sweep generator SG without changing the relationship between pulse rate and sweep rate and slope. The pulses SCO are being used when the entire mode switch S1 is in the first or sixth position. Mode switch S1-B, therefore, connects a particular resistance 26 to the emitter circuit for the transistor in generator 18 in each one of these five mode positions, so that the current source operates with a particular total resistance for determining, together with the prevailing voltage CCV, the resistance in the charge circuit for capacitor 17.

Assuming now that the probes 10 and 12 connect to the distributor circuit of a four cylinder engine, then the pulses CYN have four times the frequency as the pulses SCO. If, therefore, mode switch S1 changes to position 2 for applying pulses CYN to the sweep generator, the sweep rate has to be the fourfold value, of course, for the same engine speed. This could be obtained either by increasing the voltage CCV to the fourfold value to accordingly reduce the effective impedance of the transistor in current source 18 so as to produce the fourfold charge rate of the capacitors 17, or one could reduce the emitter resistance for transistor 18 so that the impedance in the current generator is then ¼ of the value it had when the pulses SCO were used. Such a change in the current generator 18 would not change the value of voltage CCV and still one would obtain the fourfold charge rate and sweep slope.

As mode switch S1 is set into the mode 2 position (or mode #4 or #5), switch deck S1-B connects a resistor 26a into the emitter circuit for the transistor in current source 18 which reduces the impedance therein to a value to obtain the fourfold sweep rate while voltage CCV maintains constant. The loop will still operate in precisely the same manner as aforedescribed. Moreover, a mode switch position change will not be accompanied by a period during which the feedback loop restablizes, except for a very short transition period due to the switching operation, per se.

There is now a second mode switch S2, which is adjustable according to the number of cylinders the engine has. Switch S32 is illustrated as connecting the particular resistor 26a to the second terminal of mode switch S1-B. For a six cylinder engine the mode switch S2 is in the second position connecting a resistor 26b to the second terminal of mode switch S1-B to provide a 6:1 impedance ratio relative to resistor 23 corresponding to a 1:6 frequency ratio of the pulses SCO and CYN. Finally, a resistor 26c becomes effective in an analogous manner for an eight cylinder engine when mode switch S2 has its third position.

One can, therefore, see that voltage CCV is proportional to engine speed during stationary conditions in the loop, independently from the position of the mode switch S1, i.e., independently from the pulse source. The voltage CCV can thus be used for relative speed metering as will be explained later.

The output signal of buffer 22 is the output sweep signal from generator SG and is passed through a switch 29 to a sweep control circuit 28 which controls directly the yokes or coils of the horizontal deflection circuit for the oscilloscope. Switch 29 is closed in all modes except the single cylinder mode #1, the closing control being established by a signal $\overline{S1C}$, which is true only when the system is not in mode #1. Thus, with the exception of mode #1, in all other modes the output of sweep generator SG is used for controlling the time base of the oscilloscope. The output of sweep generator SG is used additionally as time base generator for other operations to be described later. The oscilloscope in turn is controlled by the circuit network as described thus far, as well as by circuitry described next.

The signal to be displayed by the oscilloscope is fed to the Y driver (vertical deflection system) thereof, through a third deck of mode switch S1, identified as switch S1-C. Since the particular contour and waveform to be displayed is the ignition signal, the output of probe 10 is to be fed to the Y drive, or vertical deflection system to the oscilloscope. Hence, the output of probe 10 is fed directly to the switch S1-C in all modes, except the stack mode. In the stock mode, the signal to be displayed is added to that provided by a stack circuit 30. This circuit is an integrator providing stepwise increasing output, the steps resulting from input pulses RSN derived from the reset generator 15. Signal SCO resets the integrator 30. Hence, sequential reset pulses RSN each add a constant voltage (more accurately, a constant voltage-time integral) to the display signal establishing thus increasingly higher positioned base lines on the oscilloscope, so that sequential cylinder ignition signals within an engine cycle are displayed in stacked relationship. The stacking is repeated for each engine cycle under control of the pulses SCO resetting integrator 30.

The connection between the probe and switch S1-C may run over a variable attenuator circuit 31, adjustable for purposes of selecting vertical scale. The resistance network 31a combining the output of stack circuit 30 with the signal to be displayed provides additional vertical attentuation needed for this vertically aligned display of all the different ignition cycles within an engine cycle. Of course, continued display is not desired, particularly not during retrace. The electron beam should thus be suppressed in the oscilloscope. For normal operation of the oscilloscope, the retrace period is defined by the astable period of sweep reset generator, monovibrator 15. Blanking and unblanking of the oscilloscope is controlled through an unblank generator network 60 which provides suitable signals, for example, to the cathode or to the grid in the oscilloscope. During all modes except mode #1 the output signal RSN of the reset signal generator 15 is supplied via OR gate 63 through and AND gate 62, controlled by the "not mode 1" signal $\overline{S1C}$. Output of gate 62 passes through an OR gate 61 to unblank generator 60. Thus, during the modes other than mode #1 unblank generator 60 will suppress the electron beam in the oscilloscope during the astable period of monovibrator 15.

The period of retrace is not the only time during which it is desired to blank the screen of the oscilloscope; thus, the signal input for gate 62 runs over an OR gate 63, having the output RSN of reset generator 15 as one of its inputs. In addition, blanking is desired in a second situation, namely when limit clamp 27 has responded. The electron beam is arrested in the right hand position of the screen of the oscilloscope without being retraced at that time. Since no information is being displayed, the oscilloscope should be blanked. Therefore, limit clamp 27 is connected also to a Schmitt trigger 27a which is kept at and provides a first level during normal operations of sweep generator SG when producing a regular sweep signal. If the sweep signal has reached, or is about to reach, the amplitude for which limit clamp 27 arrests it, Schmitt trigger 27a is shifted to the second level which output is applied as a logic "true" signal, through the OR gate 63 to gate 62. Therefore, the oscilloscope is also blanked for the period of oscilloscope beam arresting by the limit clamp.

For a third blanking situation, the output of buffer 22 is monitored by a threshold device 32, responding to a sweep signal level somewhat below the one to which clamp 27 and Schmitt trigger 27a respond. It should be pointed out that the latter do not normally respond. Clamp 27 responds only when, for example, a pulse CYN is missing for any reason, or if the engine speed drops very rapidly and the feedback loop via integrator 20 has not yet caught up. The threshold detector 32, however, responds normally before the respective next retrace. Since the sharp ignition spike is normally used for producing pulses CYN or SCO and, therefore, reset pulses, the leading flank of that spike would normally still be displayed very shortly, before retrace is affected. This is undesirable, particularly in the parade mode as it could display one more ignition spike than the engine has cylinders.

The detector 32 thus responds to a sweep signal level shortly before the next ignition spike, and produces a third logic signal for OR gate 63 to be used via gates 62 and 61 to blank the screen before the next spike. Operation of detector 32 is restricted to all those modes where the sweep generator SG synchronizes to the engine cycle pulses SCO, i.e., when the display is in the parade mode or like in the parade mode; which is the case during the power test mode #3 (see switch S1–A). An AND gate 32a thus responds to signals $\overline{TIM}$, $\overline{SUP}$, $\overline{STA}$ to establish an enabling signal for the threshold device 32 when the system is not in the timing mode, the superimposed mode and the stack mode. In the single cylinder mode gate 62 is blocked so that any output of gate 63 is not effective for unblank control.

A provision which can be regarded as complementary to the blanking of the screen for the leading edge of an ignition spike, is found in the probe circuit and should now be described. The leading edges of the ignition spikes used for providing the reset control of the sweep generator are so short that they may have decayed already by the time the retrace is completed, so that the spike is not visible, or hardly visible on the left hand side of the screen of the oscilloscope. (A regular display sweep from left to right with reference to the viewer is assumed.) From that standpoint, one could say that detector 32 should not blank the spike on the right hand side of the screen in the parade mode. However, it is still undesirable for this type of display to separate a main spike from the succeeding wave train of the ignition signal circuit, as that wave train seen in relation to the main spike is of diagnostic value. Therefore, the probe circuit includes a hold circuit.

As stated above, the output of the probe 10 is passed to an amplifier 14, the output of which can be clamped to the highest signal value produced at any instant under the influence of the input signal as applied. Thus, there is provided a rise detector 70 connected to probe 10 responding to a fast rise of the output signal of the probe and turning on a monovibrator 71 of variable time constant. Normally, the time constant of monovibrator 71 is set to about 20 microseconds. This output pulse is used as hold-control signal amplifier 14 to hold the peak value of the ignition spike for 20 microseconds. If the particular spike is, in fact, used (in the parade mode) to control retrace, the soon following retrace control signal RSN causes control gate 72 to provide a switching signal to the single shot 71 extending its time constant to 120 microseconds. This often extends the time of the peak value of the ignition spike into the next sweep cycle so that the peak of the ignition spike, causing the retrace, will in fact, be displayed on the left hand side of the screen. It should be noted, that amplitude and relative phase of an ignition spike are of diagnostic value, and these data are not distorted by the hold circuit. The duration of a spike is not of interest for all spikes.

The 120 microsecond delay is introduced only in the parade mode and also in the power test mode, as symbolized by the alternative gating signals PAR and POT for the signal RSN as controlling (triggering) the single shot 71. At other times, the 20 microsecond peak hold is effective to counteract the lack of sufficiently high frequency response of the deflection coils of the Y driver in the oscilloscope. The 20 microsecond hold over thus enables full amplitude display of the several ignition spikes.

Before proceeding with the description of additional circuit networks operation of the oscilloscope in all modes except mode #1 will be summarized. In modes #3 and #6, respectively called power test and parade modes, mode switch S1–A connects the sweep generator SG to receive pulses SCO to synchronize to their repetition rate. The sweep generator performs one sweep per complete engine cycle. Resistor 26 is connected to current generator 18 through mode switch S1–B and the sweep circuit is connected through switch 29 to receive the normal signal from buffer 22 for controlling the oscilloscope accordingly. The unblank circuit 60 is connected through gates 61, 62 or OR gate 63 to receive either one of the three signals as described for blanking the oscilloscope during (1) retrace (2) excessively long, unstabilized sweeps, (3) shortly before the next retrace. During a sweep period there will be developed as many ignition pulses as there are cylinders in the engine. Since the pickup probe for all these pulses connects to the vertical deflection system of the oscilloscope, all of these pulses will be displayed in side by side relationship and the cycle will be repeated with each engine revolution, independent from the speed thereof. The particular ignition signal which includes the spike producing the pulse SCO is blanked at the right side of the screen but displayed as the first one of the group, with a holdover of 120 microseconds. All other spikes are fully displayed due to the 120 microsecond holdover for each of them. The display will not be disturbed by speed variations, as the sweep synchronizes rapidly to the change in frequency of pulses SCO.

Mode #2 is called the superimpose mode, in which the pulses CYN are used for the reset control of the sweep generator. The timing mode, mode #5, produces the same display as the superimpose mode. In modes #2 and #5 the movable contact of mode switch S1–A connects the input of the sweep generator SG to the output of the CYN pulses generator circuit 11. Accordingly, the sweep generator synchronizes to the CYN pulses. If the engine speed is not changed when mode switch S1 changes from position "one" to position "two" the control voltage CCV for the feedback loop in the sweep generator will not change (except for brief transients) because of the impedance change in the emitter circuit of the transistor of current generator 18. This is important, if one uses the voltage CCV directly for speed indication.

The sweep control 28 receives the faster sweep signal from sweep generator SG, but unblank control circuit 60 will receive only the retrace control signal RSN from monovibrator, retrace generator 15 and the clamp signals from units 27 and 27a should they occur. Circuit 32 is disabled in this mode so that the ignition spikes are displayed to the right on the screen of the oscilloscope. The oscilloscope will thus display the waveform of all the ignition signals. The signals for each cylinder are expanded over the entire horizontal base of the display screen so that all signals appear superimposed. For a perfect ignition circuit this would result in a more or less clear image without flickering, because the wave shapes should be the same for all pulses. Any irregularities would be noticed as a flickering or blurring of the trace and therefore, it is a very simple check as to whether the ignition circuit produces ignition signals at the desired degree of uniformity. As the retrace lasts for about 100 microseconds, the spikes are not displayed on the left hand side, the 20 microsecond holdover is not effective.

The stack mode #4 is similar, in almost all respects, to the superimpose mode #2, except that the displayed signals are spread out vertically over the screen, and at a reduced amplitude for each of them. This is due to the algebraic addition of a stepwise increasing and cyclically reset voltage as provided by integrator 30, and network 31a attenuates the signal voltages vertically. This attenuation is necessary as for the other modes the full height of the oscilloscope is used for each ignition signal.

As to the remaining mode, mode #1, it is the so-called single cylinder mode, whereby the sweep signal for the oscilloscope sweep control 28 is not derived directly from the sweep signal amplifier 27, and also the blank control signal for unblank control 60 is derived differently. The sweep generator SG, however, synchronizes to the SCO pulses. The circuit network to be described next controls the display in mode #1, and is used in parts additionally for control of tests in modes #3 and #5.

The sweep generator SG is used to control an expanding time base and sweep generator ES. The output of buffer 22 of sweep generator SG is applied to the first and the third input terminals of another switch deck, designated with S1–D of mode switch S1. A signal adjustable by a variable resistor 51 is subtracted from that input signal as derived from sweep generator SG. The voltage applied to resistor 51 is adjustable through a third deck of switch S2, designated S2–C and adjusted in accordance with the number of cylinders of the engine tested. The purpose of attenuating network 52 will be explained below. The variable element of resistor 51 is the cylinder selector switch S3. This switch will be adjusted to visible set point positions in accordance with the particular cylinder to be selected for display of its ignition signals (modes #1 and #3) and for short circuiting of the points to inhibit ignition of the particular cylinder (mode #3).

Since the SCO pulses represent progressive revolutions of the engine, the time for each ignition signal corresponds to a partial revolution covering an angle which is 720°/N with N being the number of cylinders. Hence, each sweep of principal generator SG must be divisible in segments (periods) which is equal to the total sweep period divided by N. The purpose of resistor 51 is to provide reference signals in order to permit subdivision of a complete sweep of generator SG. Switch S3 may pertain to a glider arm sweeping over resistor 51 so that resistor 51 together with the selector switch S3 constitute a potentiometer. Alternatively 51 may comprise fixed resistors with individual taps for engagement with a selecter switch arm.

The total range for the reference signals will be the same for all types of engines, but the number of reference signals to be provided is equal to the number of cylinders. The switch S3 has as many marked settings as the maximum number of cylinders for an engine expected to occur. In order to use the same set points of switch S3, for cylinderse of engines having less than eight cylinders (4 or 6), the amplitude of the refernce signal as provided through resistor 51 is made dependent on the number of cylinders for the particular engine. The total sweep is divided into eight equal portions for an eight cylinder engine, six for a six cylinder engine, four for a four cylinder engine.

Consider an eight cylinder engine, then the reference voltage setting should be slightly below half the maximum peak of the sweep for selection of cylinder four. The same cylinder setting for a four cylinder engine, however, requires a reference voltage of slightly below the peak value of a sweep signal. That same reference voltage is needed for setting "8" (of cylinder selection switch S3) for an eight cylinder engine, while setting "4" of switch S3 for an eight cylinder engine should produce the same reference voltage as setting "2" of switch S3 for a four cylinder engine. Thus, network 52, under control of switch S2, applies about half the voltage to selector potentiometer 51 (controlled by switch S3) for an eight cylinder engine as it does for a four cylinder engine. If switch S2 is adjusted for a six cylinder engine, the voltage applied by network 52 to potentiometer 51 is such that, for example, setting of switch 53 to cylinder number "3" produces the same reference voltage as a setting to cylinder number "4" for an eight cylinder engine.

Representatively, in FIGURE 3a the dashed lines are adjusting level, depicting reference values in relation to the sweep signal of progressively variable amplitude of generator SG, for the selection of one out of six cylinders of a six cylinder engine. The dash-dotted level define the four reference levels as adjustable by switch S3 corresponding to four possible cylinder selections for a four cylinder engine.

As stated, the difference between the towfold adjusted reference voltage and the sweep signal from buffer 22 is applied to contacts 1 and 3 of mode switch S1–D. The output signal of comparator 50 is representatively depicted in FIGURE 3b for a six cylinder engine and a cylinder selector number —2. The comparator signal stays true from the time the sweep signal of generator SG equals the adjusted reference value up to the retrace of the sweep signal.

The movable contact arm of switch S1–D connects to a comparator 50 which, therefore, compares the sweep signal voltage of generator SG and the initially adjustable but fixed reference voltage as derivable through the resistor network 51 signal which, depending upon the polarity of its two inputs, is either "true" or "false." The output of comparator 50 connects to an AND gate 39a which is part of auxiliary sweep generator ES and is enabled as long as the system is not in the timing mode #5. Hence, comparator 50 is operative in modes #1 and #3 to serve as input proper for auxiliary sweep generator ES.

During modes #1 and #3 the "true" or "false" logic output signals of comparator 50 control the set-input side of a flip-flop 40, to set the flip-flop when the comparator output turns from "false" to "true." For convenience it is considered that the output signal of the comparator 50 is a "true" signal as long as the sweep signal from generator SG exceeds the adjusted value of resistor 31 and "false" when the relation is reversed. Thus, flip-flop 40 is set when the sweep signal from generator SG begins to exceed the reference. The output side of the flip-flop 40 is connected to the base of a transistor 33 to render the transistor conductive when reset, while the set state of flip-flop 40 renders transistor 33 nonconductive.

It should be noted that the input for flip-flop 40 responds to the differentiation of an input signal, i.e., setting of the flip-flop 40 requires the changeover from "false" to "true" at the outputs of comparator 50 as reflected on the flip-flop by gate 39a. Thus, if the output of comparator 50 is still "true" after flip-flop 40 has been reset, it will not be set again until comparator 50 has turned "false" and than "true" again. Conversely, a change from "true" to "false" in the comparator output does not reset the flip-flop. Flip-flop 40, when set, maintains transistor 33 nonconductive which leads to following control operations including control resetting the flip-flop.

A capacitor 34 is connected across the emitter-collector path of transistor 33 for generation of a ramp or sweep signal. The capacitor charges through a current source 35. During the set state of flip-flop 40 after commencement of a "true" signal of comparator 50, transistor 33 is nonconductive, and, therefore, permits capacitor 34 to charge through current source 35; a sweep signal develops at the collector electrode of transistor 33 during charging of capacitor 34. The sweep signal has a slope as controlled by current source 35, which includes a transistor, the base of which is also controlled from the voltage CCV.

As has been repeatedly mentioned above, CCV is a speed proportional signal. The current source 35 includes a resistor network 37 governed by another deck of cylinder number switch S2 and designated S2–B. It will be recalled that the voltage CCV is a voltage proportional to the r.p.m. of the engine at any instant. This relation can be restated by saying that CCV is proportional to the frequency of the pulses SCO independent from the number of cylinders of the engine, and, still differently, the voltage CCV is proportional to the ratio of frequency of pulses CYN over the number of cylinders. The present current source, however, has to be modified as the sweep rate needed for modes #1 and #3 is dependent on the number of cylinders. Therefore, cylinder number or engine type select switch S2–B selectively connects different resistances into the emitter circuit for the transistor in current source 35 which "undoes" for this current source what the resistance network 25 does for the transistor in current source 18.

The speed dependent, cylinder independent voltage CCV together with the cylinder number dependent resistor network 37 for current source 35 create a sweep signal rate which is speed and cylinder number dependent. The collector voltage of transistor 33 is amplified by a buffer 38, the output of which is the second sweep signal of the system, as provided now by generator ES. If the number of cylinders is N, then the sweep rate of this sweep signal is $1/N$ of the rate of the sweep signal produced by the principal sweep generator SG. A limit clamp 36 clamps the sweep signal as applied to buffer 38 to a particular level once this level has been reached. As soon as that level has been reached, flip-flop 40 is reset. The reset state of flip-flop 40 renders transistor 33 conductive, capacitor 34 discharges and remains discharged until flip-flop 40 is set again at the next "false" to "true" change of comparator 50.

As one can see best from the timing diagram of FIGURES 3a through 3d the cylinder selection potentiometer 51 in the input circuit for auxiliary sweep generator ES has been adjusted so that comparator 50 produces a false signal from the time the principal sweep signal of generator SG retraced up to the time it has reached a particular level. When the output of comparator 50 turns true flip-flop 40 sets, transistor 33 is blocked and capacitor 34 begins to charge to produce the expanded sweep signal at engine speed and cylinder dependent rate. The resulting output of sweep generator is shown in FIGURE 3c. As soon as the threshold response level of limit clamp 36 has been reached, flip-flop 40 is reset (see FIGURE 3d) and transistor 33 is rendered conductive again to keep capacitor 34 short circuited.

The sweep signal from generator ES is applied to a switch 41 which is closed by a mode #1 enabling or switching signal S1–C. Hence, the sweep signal from generator ES controls in this mode the sweep control 28 of the oscilloscope. The vertical deflection of the oscilloscope is controlled by the output signal of the probe 10, as always, so that the ignition signals for a particular cylinder are displayed during sequential sweeps. Ignition signals for other cylinders will not be displayed, as there is no sweep when they occur. It is advisable to generate a special unblank signal for mode #1 to turn the beam off when not sweeping. The unblanking has to be limited to the period generator ES produces the linearly increasing output as expanded sweep for single cylinder display. For this, the flip-flop 40 can be used. An AND gate 64 responds, therefore, to the output signal of flip-flop 40 and to the mode #1 signal S1–C to feed a blanking-unblanking signal to OR gate 61, the output of which controls the unblank generator 60. The resulting signal is illustrated in FIGURE 3d, plotted in alignment with FIGURE 3c showing unblanking to be limited to the short sweep period of generator ES within each engine cycle as defined by a full sweep of generator SG (FIGURE 3a).

For selection of the respective highest cylinder number, a reference voltage close to the peak of the sweep of generator SG is used. The cylinder signal is also the one which produces signal SCO. It is important to note that once the auxiliary sweep has started (flip-flop 40 being set), a retrace of the time base sweep of generator SG does not stop the auxiliary sweep; only completion thereof does, completion being defined by response of limit clamp 36. However, it was found advisable to design labeling and to provide instructions for usage of the system such that the user of the equipment regards the cylinder signal used to provide engine cycle pulse SCO as cylinder signal "One." Therefore, an expanded sweep for covering the first ignition signal must be produced prior to the end of the sweep from generator SG, which requires the providing of the highest reference voltage value for the input circuit for the comparator 50. The lowest reference voltage needed is then the one used for selecting the second cylinder pulses; for the third cylinder a somewhat higher reference voltage is used, etc.

In summary, during the single cylinder mode #1 the principal sweep generator SG establishes a time base or phase reference for each engine cycle, and the auxiliary sweep generator ES provides a sweep signal each time a particular cylinder signal is fed to the Y driver of the oscilloscope. Adjustment of resistor 31 selects the cylinder. During mode #3 generator ES operates as described for mode #1, but its output is not used to control the oscilloscope. As was described earlier, the oscilloscope is run during mode #3 as in the parade mode #6.

During mode #3, the so-called power test is performed. For this it is important that generator ES, and here particularly flip-flop 40, provides a control signal which occurs speed independently during a particular phase of each engine cycle. For mode #3 an enabling signal POT opens a gate 48 for passing the output of flip-flop 40 to a circuit network 44 which bridges, i.e., short-circuits the contact points of the distributor in the engine to be tested. For this to occur, however, it is required that an additional test switch 45 be pressed. Upon closing operating switch 45 in mode #3 the point short-circuiting circuit 44 receives an enabling signal which is the equivalent to the unblanked signal shown in FIGURE 3d, having a speed dependent duration and a speed independent, adjustable relative phase within each engine cycle regardless of its duration. Therefore, the points can be short-circuited for a period during each engine cycle when the distributor connects the ignition circuit to a particular cylinder.

The production of any ignition pulse is suppressed when and as long as the points are short-circuited. Short-circuiting is restricted to the period during which normally the ignition pulse for one particular cylinder is produced and repeatedly during each engine cycle for as many cycles as long as switch 45 is pressed during mode #3. The test can be carried out at any engine speed, not just a particular one. Even if the engine speed varies during the test, the points will still be short-circuited at the right phase and for the required duration, so that a particular cylinder is deactivated; the cylinder to be deactivated is selected by switch S3 and resistor 51. The absence of ignition signals for one cylinder can be observed on the oscilloscope as in mode #3 the display is as in the parade mode #6.

In case a particular cylinder is short-circuited in this manner, there should be a reduction in the rpm because there is a power loss in this case; the engine is required to operate with one less cylinder. If, however, a power loss is not observed, the particular short-circuited cylinder does not operate at all and the short-circuiting does not have any effect. Therefore, upon selecting a particular cylinder by adjustment of resistor 51 in mode #3 and pressing the test switch 45 and observing a tachometer, one can readily ascertain whether the particular cylinder operates or not: the indicator should show a drop for a functioning cylinder.

The voltage CCV which is an engine speed dependent voltage can be applied to voltmeter 80 in mode #3 and by operation of mode switches S1–E and S1–F. In particular, one terminal of voltmeter receives the voltage CCV, through an adjusted potentiometer 81 and the other terminal receives a reference voltage (source 47a). Initially, i.e., for mode #3 operation and prior to passing test switch 45 the meter 80 is set by adjusting the potentiometer 81, for example, for zero of 100% reading on a relative scale. Within the range of adjustment of potentiometer 81 this can be accomplished for any engine speed, i.e., for any value of voltage CCV. Test switch 45 is then pressed. A reduction in engine speed will be indicated as a relative or percentage deviation from the engine speed prior to the test regardless of the actual value to which the speed dropped. In other words, the meter 80 will indicate the relative speed loss. This is beneficial as it does not require the engine to be accelerated or decelerated to a particular speed in order to perform this power test and in order to have a reasonably accurate and discernible reading. In this case, and for this test, one is only interested in the existence and the severity of the power loss and not in any particular numerical r.p.m. values resulting from that power loss.

A specific problem arises when the particular cylinder is to be tested, the ignition pulses of which produce the SCO pulses. If the production of such a pulse is inhibited by short-circuiting the points, the entire system would be put out of operation. Therefore, for the cylinder "one" selection, the SCO pulse must be synthesized.

For selecting the unblanking pulse to cover the period of the cylinder "one" ignition pulse, register 51 may be adjusted to such a high value that sweeping of generator ES is delayed until after the eighth or fourth or sixth cylinder pulse spikes. The sweep period is derivable, for example, from flip-flop 40 which defines also the period during which the points open, always rather shortly before the main spike in each ignition signal. An AND gate 42 thus receives true signals from flip-flop 40 and from the test switch 45 when closed. A switch 46 provides another true signal for gate 42 when cylinder "one" is to be selected.

In order to accurately determine the phase of the instant pulse SCO would occur if not impeded, a signal PRID is developed by probe 47 connected to the point contacts of the engine and being sensitive to the actual point opening. Probe 47 thus produces an enabling signal for that instant and it is that signal which passes through AND gate 42 to OR gate 43 as a synthesized SCO pulse to be passed to the sweep generator SG via mode switch S1–A in the test mode #3. The other input for OR gate 43 is, of course, pulse SCO.

As was pointed out previously, the oscilloscope displays the cylinder pulses in the test mode #3 in the same manner as in the parade mode #6. In order to provide a visual representation of the cylinder selection during a power test, the unblank control signal from flip-flop 40 (and derivable from gate 48 in the power test mode) is used to energize a dimmer control 49 which in turn controls unblank generator 60. The generator 60 is basically controlled as in the parade mode, i.e., the screen is unblanked for most of the sweep signal of generator SG. However, control 49 dims somewhat the brightness of the oscilloscope for periods during which the pulses for the selected cylinder occur. Comparing the graphs in FIGURE 3, FIGURE 3a represents the horizontal sweep of the oscilloscope also in the test mode, while the set state of flip-flop 40 for selection of a particular cylinder is shown in FIGURE 3d. Only during that set state period is the display a bright one; the other cylinder pulses are rather dim, though still visible. As test switch 45 is pressed, the previously bright visible contour of the selected cylinder pulses changes to substantially coincide with the baseline.

Operating mode #5 is provided for performing timing tests. The principal instrument here is a stroboscopic lamp 55. Block 55 is presumed to include a trigger circuit for the strobe lamp and the trigger signal is derived from an AND gate 56, causing the strobe lamp to be triggered when turning true. The principal sweep generator SG operates as aforedescribed with synchronization to the SCO pulses. The output of the sweep generator SG is used for controlling the sweep and unblanked controls 28 and 60 respectively for the oscilloscope to control the display of the ignition signals in the parade mode.

In Mode #5 use is made again of the fact that the speed proportional voltage CCV controls current source 35 in the auxiliary time base or sweep generator ES. The reset control transistor 33 in generator ES for mode 5 is controlled through flip-flop 40, as aforedescribed. Flip-flop 40 is set by pulses SCO via a gate 39b operative only in the timing mode by operation of a mode #5 signal TIM. Flip-flop 40 is reset, as in all cases, by response of limit clamp 36. The resulting output signal of generator ES as developed by buffer 38 of auxiliary sweep generator is depicted in FIGURE 3g.

Next there is provided a resistance network comprising a fixed resistor 57, connecting the output of buffer 38 to an adjustable resistor or potentiometer 58. The control signal derived from the network is drawn from the junction of resistors 57 and 58, which junction connects to the fifth terminal of mode switch 31–D. Thus, comparator 50 participates in timing mode #5 but not for control of auxiliary sweep generator ES. The control signal developed for comparator 50 is the difference between the voltage, as adjusted by means of resistor 58, and the instantaneous amplitude of the sweep output signal of generator ES. The output of comparator 50 connects to one input of AND gate 56, receiving mode signal TIM for operation. Thirdly, gate 56 receives the reset output side of flip-flop 40.

The lamp 55 thus receives a control signal through AND gate 56 as depicted in FIGURE 3g. Resistor 58 can be adjusted to a terminal position for providing a dominating input so that the output of comparator 50 is true continuously. The edge of the output signal of flip-flop 40 corresponding to a shift to the set state serves as trigger for the strobe lamp; this leading edge coincides with SCO as the latter pulse sets the flip-flop in the TIM mode. In general, gate 56 turns false when comparator 50 does, which is possible if resistor 58 is adjusted to permit the input for the comparator to turn negative at times. The output of buffer 38 drops to its lowest value always after completion of an auxiliary sweep and flip-flop 40 resets. Flip-flop 40 sets with the SCO pulse at the beginning of each engine cycle as counted in accordance with the system. The flip-flop 40 thus prepares gate 56 for response to occur at the time the comparator 50 turns true again, which time is determined by the particular adjustment of resistor 58. As the output of comparator 50 turns true, the output of gate 56 turns likewise true which signal is used to trigger strobe lamp 55.

The leading and trailing edges of a comparator-true signal vary proportional to the speed of the engine in comparison with the time of pulse SCO, because the slope of the sweep signal provided by buffer 38 is controlled from the voltage CCV which is proportional to engine speed. The duration of the true output of comparator 50 varies with speed, but phase angle of the leading edge relative to pulses SCO remains constant in relation to the SCO (cylinder engine) cycle, for constant adjusting position of potentiometer 58.

It can thus be seen that strobe lamp 55 is fired at the adjustable and speed-variable, leading edge of the true output pulse of comparator 50. Usually a flywheel of an automotive engine is provided with a visible marker. Upon illuminating the flywheel by means of this strobe lamp flash, for example, at the time this marker passes through a particular position, this marker will appear in a standing position. As strobe lamp 55 is triggered (1)

in strict synchronism with the rotation of the engine and (2) at a speed dependent phase, the marker should appear standing even if the engine speed varies, unless some mechanism in the engine changes the timing phase.

It was stated above that the cylinder selected to be the "first" one in that its ignition pulse is used to develop pulse SCO, was arbitrarily selected. This statement should be modified to some extent. One will select as the "first" cylinder within this scheme the one so that the marker can be made visible when the strobe lamp is placed in a convenient position for illumination so that the marker is conveniently observable. In addition, of course, the resistor 58 can be adjusted as to the particular phase of the strobe lamp.

In mode 5 with lamp 55 flashing the engine speed is changed in order to check on the so-called ignition advance. If the ignition advance were not there, or if it is not working properly, then the marker should remain "stationary" as seen in the strobescopic illumination, even if the engine speed is being changed. The time between a pulse SCO and a strobe lamp flash is speed dependent, i.e., the phase of strobe ignition remains constant within an ignition cycle. The ignition advance mechanism of the engine when working properly shifts the ignition time relative to the rotation of the engine, and phase shift of the marker will thus be observed. That phase shift meters the ignition advance and can thus be tested in this manner.

Meter 80 is time-shared and used differently in timing mode #5. Mode switch S1–F connects ground to one side of meter 80, while mode switch S1–E connects a meter driver 84 to the other side of meter 80. Driver 84 responds to the average signal, depicted as false signal in FIGURE 3, and logically definable as $\overline{40}$ TIM $\overline{50}$, using the terms $\overline{40}$ and $\overline{50}$. AND gate 53 combines the appropriate signals so that drive 84 applies a speed-independent voltage to meter representative of the phase angle between pulses SCO and the strobe lamp ignition. Additionally, meter 80 can be used to measure the point resistance. This may be possible in one of the other modes, for example, mode #4, wherein meter 80 is connected, by means of switches S1–E and S1–F to opposite contacts of the points.

The invention is not limited to the embodiments described above, but all changes and modifications thereof not constituting departures from the spirit and scope of the invention are intended to be covered by the following claims.

What is claimed is:

1. System for testing automotive engines, or the like, comprising:
    first means for coupling to the ignition circuit of an engine to derive therefrom signals representative of ignition signals in the ignition circuit;
    second means connected to the first means and being responsive at least to particular ones of the signals as provided by the first means to provide a control signal, the amplitude of which progressively varying linearly from a first level until reset, and including third means responsive to the particular signals representing ignition pulses for the particular cylinder of the engine, for resetting the control signal to the first level, to obtain subsequently the progressive linear amplitude variation of the control signal from the first level;
    fourth means connected to the first and second means for controlling the rate of linear amplitude variation of the control signal in accordance with the rate of the particular signals;
    adjustable reference means for providing a signal at an adjustable level corresponding to a particular phase within a complete engine cycle;
    fifth means connected to the second and the reference means for providing a second control signal upon occurrence of the adjusted level as amplitude of the first control signal; and
    means responsive to the second control signal for providing test functions for the engine in response to the second control signal.

2. A system, as set forth in claim 1, the fifth means being connected to the ignition circuit of the engine to inhibit ignition thereof in response to the second control signal.

3. A system, as set forth in claim 2, and comprising in addition an adjustable means connected to the fourth means for providing an indication of the relative speed drop in response to operation of the fifth means, there being manually operable means for governing the connection between the fifth means and the ignition circuit of the engine for selectively obtaining said inhibition for a cylinder as selected by the adjustable reference means.

4. A system as set forth in claim 1, the means responsive to the second control signal including a stroboscopic lamp.

5. A system as set forth in claim 1, the fourth means connected to compare the control signal with a reference signal and including an integrator to be responsive to the comparator and controlling the rate of the linear amplitude variation.

6. A system for testing automotive engines comprising:
    first means for coupling to the ignition circuit of an engine to derive therefrom signals representative of ignition signals;
    second means for providing a linear sweep signal and being connected to the first means for resetting and restarting the production of sequential sweep signals at a rate determined by the signals of first means;
    third means coupled to the second means and being responsive to the average value of the sweep signal and adjusting the entire slope of the sweep of the sweep signal for maintaining the average value constant; and
    an oscilloscope coupled to the first and second means for receiving the sweep signal as time base signal and further receiving the signal representative of ignition signals for displaying them over the time base as provided by the sweep signal.

7. A system, as set forth in claim 6, including means for selective operation of the effective connection between the first and the second means to provide for selectively setting of the sweep signal in synchronism with each ignition signal or with the ignition signal for one particular cylinder.

8. A system, as set forth in claim 6, the third means including fourth means for adjusting the slope adjusting means in accordance with the number of cylinders of the engine, the third means further including fifth means for developing a signal having a value proportional to the engine speed;
    sixth means for selectively causing the second means to respond to every ignition signal or to every ignition signal for one particular cylinder;
    seventh means operated in synchronism with the sixth means for enabling and disabling the fourth means so that said signal is essentially independent from the selection in accordance with the sixth means; and
    eighth means connected to the fifth means to provide an indication of engine speed.

9. A system as set forth in claim 6, the third means including an integrator connected to integrate the difference between the sweep signal and a reference signal and providing a speed representing signal controlling the slope of the ramp.

10. A system for testing automotive engines comprising:
    first means for coupling to the ignition circuit of an engine to derive therefrom signals representative of the ignition signals in the circuit;

second means coupled to the first means for providing a linear ramp signal and being reset by particular signals as derived by the first means corresponding to full revolutions of the engine;

third means coupled to the first and second means controlling the slope of the linear ramp signal in proportion to the average value of the ramp signal;

fourth means connected to the second means and including adjustable means for providing signals having a particular adjustable phase characteristic with reference to and occurring repeatedly for each ramp signal as provided by the second means;

fifth means connected to the third and fourth means and providing a second ramp signal at a slope as controlled by the third means and commencing in response to said signals as provided by the fourth means having said particular phase characteristics, the second ramp being of shorter duration than the first ramp; and sixth means connected for providing a control signal for each engine cycle for performing test functions in the engine and being produced in timed relation to production of said second ramp signal, the control signal having duration proportionate to and a repetition rate equal to said rate and having a phase as adjusted by the adjustable means in the fourth means with reference to each engine cycle.

11. A system, as set forth in claim 10, including an oscilloscope coupled to the fifth means for receiving the second ramp signal as time base and being coupled to the first means for receiving said ignition signals; the oscilloscope being further connected to the sixth means for unblanking the display in response to the control signal.

12. A system, as set forth in claim 10, including means connected to the sixth means for short circuiting the ignition circuit in response to the control signal.

13. A system as set forth in claim 11, the fourth means including adjustable means providing reference signals for comparison with the first ramp signal, the adjustable means including means for rendering the reference signal dependent upon the number of cylinders of the engine.

14. A system for testing automotive engines, or the like, comprising:

first means for coupling to the ignition circuit of an engine to derive therefrom signals representative of the ignition signals in the circuit;

second means coupled to the first means and being responsive to at least particular ones of the signals to provide a signal essentially proportionate to the speed of the engine;

third means coupled to the second means and providing a linear ramp signal in response to said speed proportionate signal, so that the slope of the linear ramp is proportionate to engine speed;

fourth means coupled to the first, second and third means for operating the third means in predeterminable, speed-independent phase relation to particular ones of the signals as provided by the first means; and fifth means connected to the third means and providing a control signal for performing test functions for the engine and being produced in response to occurrence of and for a duration proportionate to the slope of the ramp signal.

15. A system as set forth in claim 14, the second means including a second linear ramp signal generator, the slope of the second ramp being proportionate to the speed of the engine, the second generator being coupled to the first means for being reset by signals representing the ignition signals of a particular cylinder.

16. A system as set forth in claim 15, the fourth means connecting the third means to the second ramp generator, the connection including adjustable means responsive to an adjustable level when occurring in the second ramp signal for controlling commencement of the first ramp signal.

17. A system as set forth in claim 14, the fifth means including adjustable means responsive to a particular adjustable level along the ramp to provide a second control signal, the system further including a stroboscopic lamp connected to the fifth means to be triggered in response to the second control signal.

18. A system as set forth in claim 17, including means connected to the fifth means to provide a phase representative measuring signal, representing the phase angle of said stroboscopic lamp triggering and being connected to a measuring instrument to provide an indication of that phase angle.

19. A system as set forth in claim 14, including an oscilloscope coupled to the third means for receiving the ramp signal as time base and being coupled to the first means for receiving said ignition signals, the oscilloscope being further connected to the fifth means for unblanking the display in response to the control signal.

20. A system for testing automotive engines, comprising:

first means for coupling to the ignition circuit of an engine to derive therefrom first signals representative of the ignition signals in the circuit;

second means connected to the first means and providing sweep signals recurring for each engine cycle and having a sweep rate essentially proportionate to the engine speed as represented by the rate of occurrence of the first signals;

an oscilloscope connected to the first and second means to display the ignition signals over a time base represented by the sweep signal as provided by the second means; and means included in the connection between the first means and the oscilloscope to provide an amplitude holdover of the ignition signal as displayed to extend beyond the period of retrace of the oscilloscope and to appear at the beginning at the respective next sweep.

21. A system as set forth in claim 20, comprising means responsive to the test function signal for providing a change in display intensity by the oscilloscope for the duration of the test function signals.

22. A system as set forth in claim 20, comprising means responsive to the ignition spikes to provide for an amplitude hold of the spike for a predetermined period.

23. A system as set forth in claim 22, there being means responsive to a spike in a particular one of the ignition signals per engine cycle for controlling retrace of the sweep signal, means responsive to the spike of the particular ignition signals to provide for an extended amplitude hold to cover the period of retrace; and means connected to blank the oscilloscope prior to occurrence of the spike towards the end of each peak.

24. A system for testing automotive engines, comprising:

first means for coupling to the ignition circuit of an engine to derive therefrom first signals representative of the ignition signals in the circuit;

second means connected to the first means and providing a sweep signal recurring for each ignition signal, retrace being controlled in response to the signal and having a sweep rate essentially proportionate to the rate of the ignition signals;

an oscilloscope connected to the first and second means to display the ignition signals over a time base represented by the sweep signal as provided by the second means; and third means connected to the first means for providing a holdover of the amplitude of the peak portion of each ignition signal, for a particular period.

25. A system for testing automotive engines comprising:
- first means for coupling to the engine to derive therefrom signals representative of progressing engine cycles and on a periodic basis;
- second means for providing a linear sweep signal and being connected to the first means for resetting and restarting the production of sequential sweep signals at a rate determined by the signals of first means;
- third means including an integrator coupled to the second means and being responsive to deviations of the average value of the sweep signal from a reference and further connected for adjusting the slope of the sweep of the sweep signal to maintain that average value and therefore, the amplitude thereof constant; and
- fourth means coupled to the first and second means for receiving the sweep signal as time base signal for providing test function signals synchronized to the repetition of engine cycles, and in adjustable phase relation relative thereto.

26. A system as set forth in claim 25, including means connected to the fifth means for short circuiting the ignition circuit in response to the control signal and for one particular cylinder.

27. A system as set forth in claim 26, including adjustable means connected to the third means for providing a relative speed loss indication upon operation of the short circuiting means.

28. A system for testing automotive engines comprising:
- first means for coupling to the ignition circuit of an engine to derive therefrom signals representative of ignition signals;
- second means for providing a sweep signal and being connected to the first means for resetting and restarting the production of sequential sweep signals at a rate determined by the signals of first means;
- third means coupled to the first and second means and being responsive to at least some of the signals representing the ignition signals for adjusting the slope of the sweep of the sweep signal;
- a plurality of fourth means connected to the third means and being independently operable to respectively provide a plurality of test function signals for the automotive engine; and
- indicating means responsive to the operation of the fourth means of the plurality in a particular sequence.

29. A system for testing automotive engines comprising:
- first means for coupling to the ignition circuit of an engine to derive therefrom signals representative of ignition signals;
- second means coupled to the breaker point for providing a signal on a periodic basis representing at least one phase of the periodic opening and closing of the breaker points;
- third means for providing a sweep signal and being connected to the first means for resetting and restarting the production of sequential sweep signals at a rate determined by the signals of first means;
- fourth means coupled to the first and third means signal for adjusting the slope of the sweep of the sweep signal in dependence upon the repetition rate of the ignition signals;
- fifth means coupled to the third means for receiving the sweep signal as time base signal to derive therefrom control signals of variable phase to span a period during which the breaker points operate to generate the ignition signal for a particular cylinder; and
- means connected to the second, third and fourth means to substitute the signals from the second means for the control of the generation of sequential sweep signals when upon adjustment of the fifth means signals of the first means are not generated.

References Cited

UNITED STATES PATENTS

| | | | |
|---|---|---|---|
| 2,428,926 | 10/1947 | Bliss. | |
| 2,430,154 | 11/1947 | Woodward. | |
| 2,948,857 | 8/1960 | Welcome. | |
| 2,974,274 | 3/1961 | Lindberg et al. | |
| 2,986,032 | 5/1961 | Heyer | 73—117.2 |
| 3,186,218 | 6/1965 | Hollis | 73—117.2 |

JERRY W. MYRACLE, Primary Examiner

U.S. Cl. X.R.

324—16